(12) United States Patent
Brown et al.

(10) Patent No.: US 10,176,082 B2
(45) Date of Patent: Jan. 8, 2019

(54) Z/OS SMF/RMF WORKLOAD DATA PLAYBACK WITH WEB DASHBOARD VISUALIZATION

(71) Applicant: International Business Machines Corporation, Armonk, NY (US)

(72) Inventors: Thomas R. Brown, Hyde Park, NY (US); Thomas W. Conti, Poughkeepsie, NY (US); Kyle R. Moser, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 15/197,835

(22) Filed: Jun. 30, 2016

(65) Prior Publication Data

US 2018/0004634 A1 Jan. 4, 2018

(51) Int. Cl.
*G06F 11/34* (2006.01)
*G06F 11/36* (2006.01)

(52) U.S. Cl.
CPC ................ *G06F 11/3676* (2013.01)

(58) Field of Classification Search
CPC ..... G06F 11/079; G06F 11/30; G06F 11/3668
USPC ....................... 714/37, 38.1, 47.1
See application file for complete search history.

(56) References Cited

U.S. PATENT DOCUMENTS

| | | | |
|---|---|---|---|
| 6,321,218 B1* | 11/2001 | Guay | G06F 17/30336 |
| 8,214,842 B2 | 7/2012 | Jaquet et al. | |
| 9,081,613 B2 | 7/2015 | Bieswanger et al. | |
| 9,122,782 B2 | 9/2015 | Nardelli et al. | |
| 2006/0064691 A1* | 3/2006 | Blaisdell | G06F 11/3409 718/100 |
| 2006/0095907 A1* | 5/2006 | Barsness | G06F 11/3466 718/100 |
| 2006/0106851 A1* | 5/2006 | Warshawsky | G06F 17/30368 |
| 2007/0067369 A1* | 3/2007 | Minshall | G06F 11/3447 |
| 2008/0120406 A1* | 5/2008 | Ahmed | G06F 11/3414 709/224 |

(Continued)

OTHER PUBLICATIONS

Berselli, S., et al., "A Cross-Paltform Database infrastructure Monitoring Dashboard for the Hanover insurance Group" (Dec. 12, 2012) Worcester Polytechnique Institute. See abstract; 94 pgs.

(Continued)

*Primary Examiner* — Chae M Ko
(74) *Attorney, Agent, or Firm* — Cantor Colburn LLP; William Kinnaman (57) ABSTRACT

Aspects of the present invention include a method, system and computer program product for comparing data from prior and current software workload runs and for visually presenting the resulting compared data to a user for further data interpretation. The method includes a processor obtaining prior software workload run data from a database; obtaining current software workload run data; comparing the prior software workload run data with the current software workload run data to determine one or more statistical measures between the prior software workload run data and the current software workload run data; and displaying the determined one or more statistical measures therebetween to allow a user to analyze the prior software workload run data and the current software workload run data.

20 Claims, 6 Drawing Sheets

(56) References Cited

U.S. PATENT DOCUMENTS

| | | | |
|---|---|---|---|
| 2008/0162411 A1* | 7/2008 | Buckler | G06F 17/30306 |
| 2009/0240802 A1* | 9/2009 | Shankar | H04L 41/0853 |
| | | | 709/224 |
| 2010/0218031 A1* | 8/2010 | Agarwal | G06F 11/0709 |
| | | | 714/2 |
| 2010/0223253 A1* | 9/2010 | Gopal | G06F 17/30306 |
| | | | 707/713 |
| 2012/0060168 A1* | 3/2012 | Lee, II | G06F 9/4887 |
| | | | 718/104 |
| 2013/0124267 A1* | 5/2013 | O—Sullivan | G06Q 30/06 |
| | | | 705/7.36 |
| 2013/0159457 A1* | 6/2013 | Gholmieh | H04L 1/0009 |
| | | | 709/217 |
| 2015/0248344 A1 | 9/2015 | Farinacci et al. | |
| 2016/0048433 A1* | 2/2016 | Andre | G06F 11/2033 |
| | | | 714/4.1 |
| 2017/0330109 A1* | 11/2017 | Maughan | G06N 99/005 |

OTHER PUBLICATIONS

List of IBM Patents or Patent Applications Treated as Related (Appendix P), Filed Jun. 30, 2016, 2 pages.

Shahzad, K., "A Technical Study of Charge back and Monitoring Systems in Virtual Environment" (May 19, 2008) Network and System Administration, Oslo University College. See p. 35 & 41-43; 77 pgs.

Thomas R. Brown, et al., Pending U.S. Appl. No. 15/197,826 Entitled "Run Time Workload Threshold Alerts for Customer Profiling Visualization" filed Jun. 30, 2016.

Thomas R. Brown, et al., Pending U.S. Appl. No. 15/197,828 Entitled "Run Time and Historical Workload Report Scores for Customer Profiling Visualization" filed Jun. 30, 2016.

Thomas W. Conti, et al., Pending U.S. Appl. No. 15/197,827 Entitled "Run Time Test Workload Customer Profiling Baselines Visualization" filed Jun. 30, 2016.

Thomas W. Conti, et al., Pending U.S. Appl. No. 15/197,829 Entitled "Run Time Automatic Workload Tuning Using Customer Profiling Workload Comparison" filed Jun. 30, 2016.

Thomas W. Conti, et al., Pending U.S. Appl. No. 15/197,831 Entitled "Using Test Workload Run Facts and Problem Discovery Data as Input for Business Analytics to Determine Test Effectiveness" filed Jun. 30, 2016.

Thomas W. Conti, et al., Pending U.S. Appl. No. 15/197,833 Entitled "Run Time TPNS Workload Controls for Test Workload Tuning in Relation to Customer Profiling Workload" filed Jun. 30, 2016.

Thomas W. Conti, et al., Pending U.S. Appl. No. 15/197,843 Entitled "Visual Test Workload Execution Modeling" filed Jun. 30, 2016.

Thomas W. Conti, et al., Pending U.S. Appl. No. 15/197,844 Entitled "Run Time SMF/RMF Statistical Formula Methodology for Generating Enhanced Workload Data Points for Customer Profiling Visulization" filed Jun. 30, 2016.

List of IBM Patents or Patent Applications Treated as Related (Appendix P), Filed Apr. 14, 2017, 2 pages.

Thomas R. Brown, et al., Pending U.S. Appl. No. 15/424,971 Entitled "Run Time Workload Threshold Alerts or Customer Profiling Visualization" filed Feb. 6, 2017.

Thomas R. Brown, et al., Pending U.S. Appl. No. 15/427,129 Entitled "Run Time and Historical Workload Report Scores for Customer Profiling Visualization" filed Feb. 8, 2017.

Thomas W. Conti, et al., Pending U.S. Appl. No. 15/424,965 Entitled "Using Customer Profiling and Analytics to Understand Customer Environment and Workload Complexity and Characteristics by Industry" filed Feb. 6, 2017.

Thomas W. Conti, et al., Pending U.S. Appl. No. 15/424,973 Entitled "Run Time Test Workload Customer Profiling Baselines Visualization" filed Feb. 6, 2017.

Thomas W. Conti, et al., Pending U.S. Appl. No. 15/427,130 Entitled "Visual Test Workload Execution Modeling" filed Feb. 8, 2017.

Thomas W. Conti, et al., Pending U.S. Appl. No. 15/427,135 Entitled "Run Time Automatic Workload Tuning Using Customer Profiling Workload Comparison" filed Feb. 8, 2017.

Thomas W. Conti, et al., Pending U.S. Appl. No. 15/427,137 Entitled "Using Test Workload Run Facts and Problem Discovery Data as Input for Business Analytics to Determine Test Effectiveness" filed Feb. 8, 2017.

Thomas W. Conti, et al., Pending U.S. Appl. No. 15/429,262 Entitled "Measuring and Optimizing Test Resources and Test Coverage Effectiveness Through Run Time Customer Profiling and Analytics" filed Feb. 10, 2017.

Thomas W. Conti, et al., Pending U.S. Appl. No. 15/429,265 Entitled "Using Run Time and Historical Customer Profiling and Analytics to Determine Customer Disaster Recovery vs Production Differences, and to Enhance Customer Disaster Recovery Readiness and Effectiveness" filed Feb. 10, 2017.

Thomas W. Conti, et al., Pending U.S. Appl. No. 15/429,268 Entitled "Using Workload Profiling and Analytics and Score Complexity of Test Environments and Workloads" filed Feb. 10, 2017.

List of IBM Patents or Patent Applications Treated as Related (Appendix P), Filed Sep. 15, 2016, 2 pages.

Thomas R. Brown, et al., Pending U.S. Appl. No. 15/264,269 Entitled "Using Customer Profiling and Analytics to Create a Relative, Targeted, and Impactful Customer Profiling Environment/Workload Questionnaire" filed Sep. 14, 2016.

Thomas W. Conti, et al., Pending U.S. Appl. No. 15/259,094 Entitled "Z/OS SMF Record Navigation Visualization Tooling" filed Sep. 8, 2016.

Thomas W. Conti, et al., Pending U.S. Appl. No. 15/259,099 Entitled "Measuring and Optimizing Test Resources and Test Coverage Effectiveness Through Run Time Customer Profiling and Analytics" filed Sep. 8, 2016.

Thomas W. Conti, et al., Pending U.S. Appl. No. 15/259,104 Entitled "Using Customer Profiling and Analytics to Understand, Rank, Score, and Visualize Best Practices" filed Sep. 14, 2016.

Thomas W. Conti, et al., Pending U.S. Appl. No. 15/259,107 Entitled "Using Best Practices Customer Adoption Business Intellegence Data as Input to Enterprise Resource Planning (ERP)" filed Sep. 8, 2016.

Thomas W. Conti, et al., Pending U.S. Appl. No. 15/259,110 Entitled "Using Run Time and Historical Customer Profiling and Analytics to Determine Customer Test vs. Production Differences, and to Enhance Customer Test Effectiveness" filed Sep. 8, 2016.

Thomas W. Conti, et al., Pending U.S. Appl. No. 15/259,115 Entitled "Using Run Time and Historical Customer Profiling and Analytics to Determine Customer Disaster Recovery vs Production Differences, and to Enhance Customer Disaster Recovery Readiness and Effectiveness" filed Sep. 8, 2016.

Thomas W. Conti, et al., Pending U.S. Appl. No. 15/259,120 Entitled "Determining If Customer Characteristics by Customer Gography, Country, Culture or Industry May Be Further Applicable to a Wider Customer Set" filed Sep. 8, 2016.

Thomas W. Conti, et al., Pending U.S. Appl. No. 15/259,122 Entitled "Using Customer and Workload Profiling and Analytics to Determine Score, and Report Portability of Customer and Test Environments and Workloads" filed Sep. 8, 2016.

Thomas W. Conti, et al., Pending U.S. Appl. No. 15/259,124 Entitled "Using Customer Profiling and Analytics to Understand Customer Workload Complexity and Characteristics by Customer Geography, Country, and Cuture" filed Sep. 8, 2016.

Thomas W. Conti, et al., Pending U.S. Appl. No. 15/259,130 Entitled "Using Workload Profiling and Analytics and Score Complexity of Test Environments and Workloads" filed Sep. 8, 2016.

Thomas W. Conti, et al., Pending U.S. Appl. No. 15/259,168 Entitled "Using Customer Profiling and Analytics to Understand Customer Environment and Workload Complexity and Characteristics by Industry" filed Sep. 8, 2016.

(56) References Cited

OTHER PUBLICATIONS

Thomas W. Conti, et al., Pending U.S. Appl. No. 15/264,630 Entitled "Using Customer Workload Profiling and Analytics to understand and Visualize Customer Workload Execution" filed Sep. 14, 2016.
Thomas W. Conti, et al., Pending U.S. Appl. No. 15/264,631 Entitled "Using Run Time and Historical Customer Profiling and Analytics to Iteratively Design, Develop, Test, Tune, and Maintain a Customer-Like Test Workload" filed Sep. 14, 2016.
Thomas W. Conti, et al., Pending U.S. Appl. No. 15/264,632 Entitled "Using Customer Profiling and Analytics to More Accurately Estimate and Generate and Agile Bill of Requirements and Sprints for Customer or Test Workload Port" filed Sep. 14, 2016.
Thomas W. Conti, et al., Pending U.S. Appl. No. 15/264,634 Entitled "Standardizing Run-Time and Historical Customer and Test Environments and Workloads Comparisons Using Specific Sets of Key Platform Data Points" filed Sep. 14, 2016.
Thomas W. Conti, et al., Pending U.S. Appl. No. 15/264,638 Entitled "Using Run-Time and Historical Customer Profiling and Analytics to Determine and Score Customer Adoption Levels of Platform Technologies" filed Sep. 14, 2016.
Thomas W. Conti, et al., Pending U.S. Appl. No. 15/264,639 Entitled "Standardizing Customer and Test Data and Information Collection for Runtime and Historical Profiling Environments and Workload Comparisons" filed Sep. 14, 2016.

\* cited by examiner

Z/OS SMF/RMF WORKLOAD DATA PLAYBACK WITH WEB DASHBOARD VISUALIZATION

BACKGROUND

The present invention relates to the testing of software, and more specifically, to a method, system and computer program product that implement aspects of workload and operational profiling, thereby resulting in improvements in the testing of customer software.

In the field of software testing, as in many other technical fields, improvements are constantly being sought, primarily for cost and accuracy reasons. A fundamental goal of software testing in theory is to identify all of the problems in a customer's software program before the program is released for use by the customer. However, in reality this is far from the case as typically a software program is released to the customer having some number of problems that were unidentified during the software development and testing process.

A relatively more proactive approach to improving software testing is sought that employs traditional methods of understanding characteristics of clients' environments, augmented with a process of data mining empirical systems data. Such client environment and workload profiling analysis may result in software test improvements based on characteristics comparisons between the client and the test environments.

SUMMARY

According to one or more embodiments of the present invention, a computer-implemented method includes obtaining, by a processor, prior software workload run data from a database; and obtaining, by the processor, current software workload run data. The method also includes comparing, by the processor, the prior software workload run data with the current software workload run data to determine one or more statistical measures between the prior software workload run data and the current software workload run data. The method further includes displaying, by the processor, the determined one or more statistical measures between the prior software workload run data and the current software workload run data to allow a user to analyze the prior software workload run data and the current software workload run data.

According to another embodiment of the present invention, a system includes a processor in communication with one or more types of memory, the processor configured to obtain prior software workload run data from a database, and to obtain current software workload run data. The processor is also configured to compare the prior software workload run data with the current software workload run data to determine one or more statistical measures between the prior software workload run data and the current software workload run data. The processor is further configured to display the determined one or more statistical measures between the prior software workload run data and the current software workload run data to allow a user to analyze the prior software workload run data and the current software workload run data.

According to yet another embodiment of the present invention, a computer program product includes a non-transitory storage medium readable by a processing circuit and storing instructions for execution by the processing circuit for performing a method that includes obtaining, by a processor, prior software workload run data from a database, and obtaining, by the processor, current software workload run data. The method also includes comparing, by the processor, the prior software workload run data with the current software workload run data to determine one or more statistical measures between the prior software workload run data and the current software workload run data. The method further includes displaying, by the processor, the determined one or more statistical measures between the prior software workload run data and the current software workload run data to allow a user to analyze the prior software workload run data and the current software workload run data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
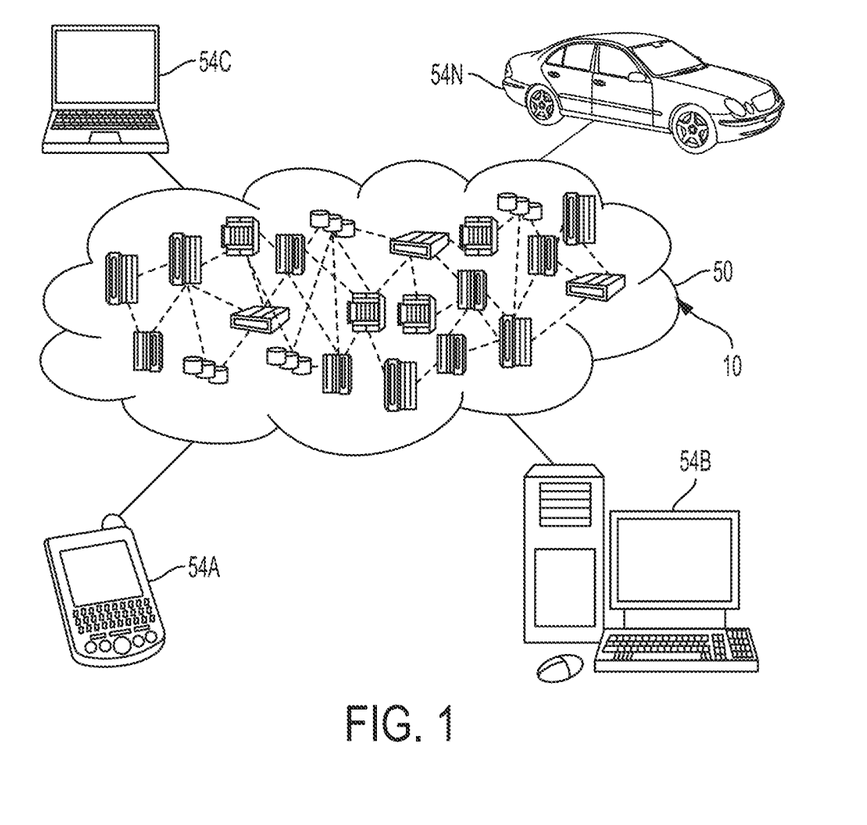
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
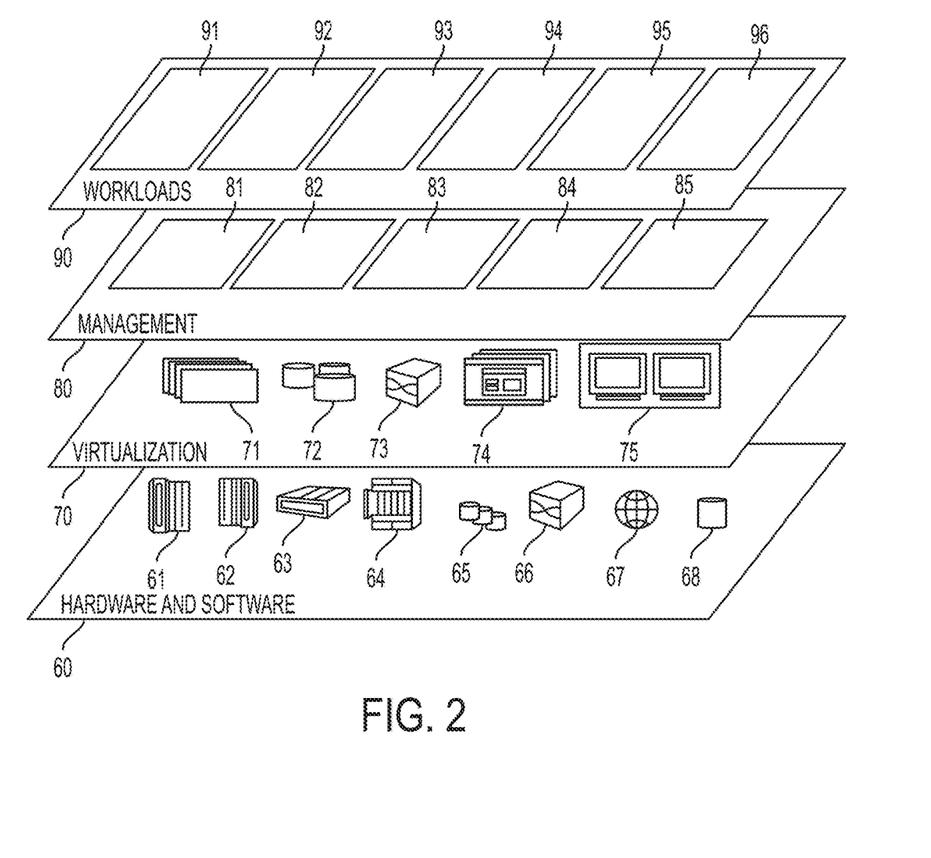
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for comparing data from a prior software workload run to data from a current software workload run and for visually presenting the resulting compared data to a user for further data interpretation, in accordance with one or more embodiments of the present invention.

Figure 3:
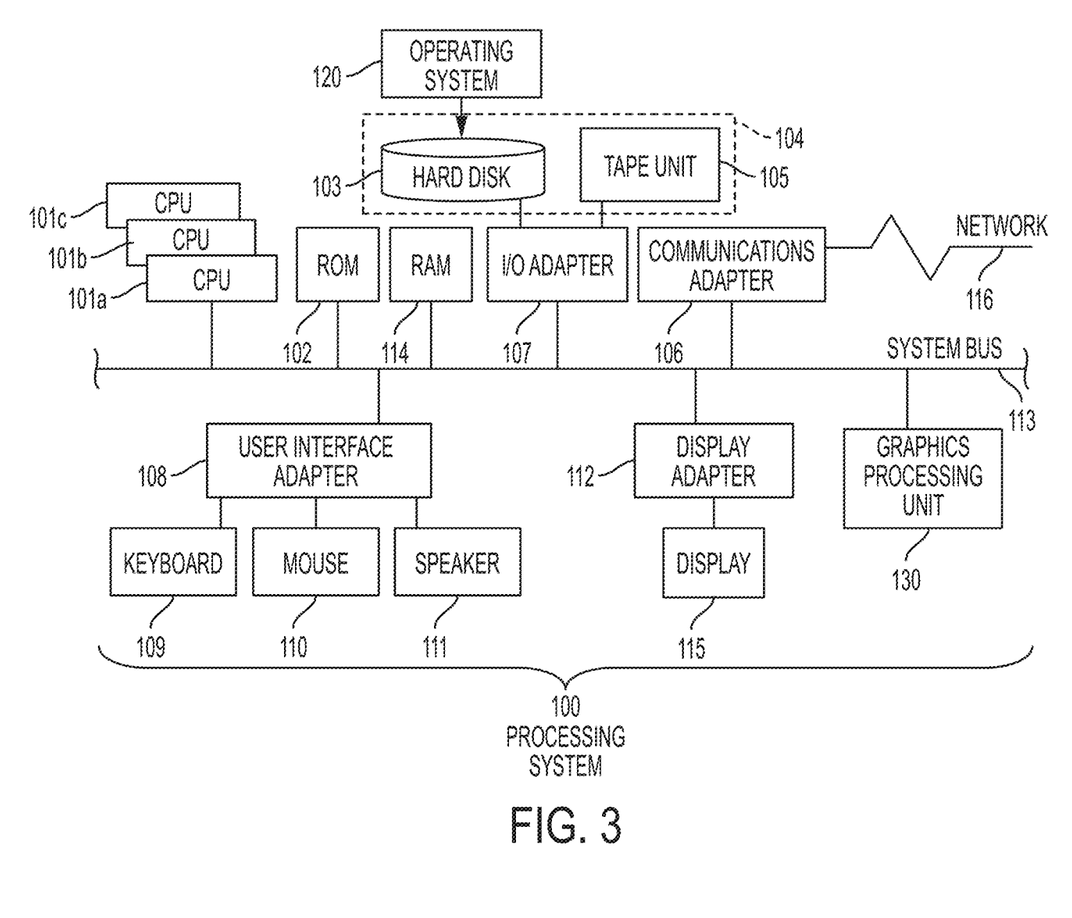
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for comparing data from a prior software workload run to data from a current software workload run and for visually presenting the resulting compared data to a user for further data interpretation.

In typical software test environments, test workload parameters are sometimes non-productive, employing non-customer like settings that do not find the problems most likely to be discovered in customer production computing environments. As a result, test resources and time are wasted by yielding test results that are non-optimized. Also, test time is not recovered in real time since knowledge of the test activity characteristics deficiency is either only known via post processing analysis or not at all. As used herein, the term "workload" includes not only software but also hardware and firmware.

Further, existing system management facility workload data and resource measurement facility workload data (i.e., SMF/RMF) visual presentation capabilities are provided through static text reports, and relatively limited and manually manipulated visuals. Visuals can include text based and spreadsheet type presentation, but not a highly flexible web dashboard interface with high definition and real-time customization. Also, existing post-workload run data views are limited to post-processing reports in a text based or spreadsheet based view with limited visualization and manual (possibly intensive) playback capabilities.

One or more embodiments of the present invention utilize a body of available customer data and/or test data, where the customer data and/or test data may be run-time and/or historical data, to provide the capability to playback stored data against run-time and/or historical data to perform analysis in real time or post processing and to view the results in a relatively informative and flexible visual manner.

In addition, one or more embodiments of the present invention may also include a method and a system for real time or post processing detection and discovery of test workload characteristics alignment with each or all members of a set of customer production workload environments across a set of statistical measures with run time visualization of customer time series data versus live test system time series data to identify and mitigate poor test characteristics in real time or as a post processing exercise.

Further, one or more embodiments of the present invention provide the capability to playback system management facility workload data and resource measurement facility workload data to compare with current (i.e., near real-time) workload run data and/or previously saved workload run data. Exemplary embodiments may also be used to playback and contrast workload data from one test to another. The data may be presented to the user or operator using a customizable and flexible web dashboard type visualization or diagram on a video screen display, for example.

One or more embodiments of the present invention provide the capability for the user or operator to draw significantly faster and more granular, intuitive, and accurate data comparisons, and to tune workloads relatively much closer to the desired goal—for example, to emulate key characteristics of a client workload environment or a test recreation or replication. Also, the exemplary embodiments provide the capability for the user or operator to significantly reduce the amount of valuable and finite operating system systems, storage, network, environmental, personnel time and resources to accomplish test objectives, thereby resulting in financial savings to the software test organization and a reduced environmental impact. In addition, the exemplary embodiments provide the capability for the user or operator to increase test efficiency through greater test coverage, thereby resulting in greater product quality and customer satisfaction.

In addition, one or more embodiments of the present invention provide the capability of a relatively high quality and intuitive visual playback for a subset of key data points of a previously saved workload data run, with the optional capability to compare to a current/active workload run(s). The playback capability may provide highly customizable graphical dashboard web views of the workload run data either stand-alone or in comparison with other workload run data.

One or more embodiments of the present invention may utilize, for example, a customizable Linux web interface, Java servlets and related technologies, and an IBM z/OS DB2 database or other types of database or memory for storing and accessing the SMF/RMF workload data. Exemplary embodiments provide the end-user with the capability to select one or many SMF/RMF data points of interest for stand-alone or multiple workload comparison playback.

In one or more embodiments of the present invention, a front-end user interface may comprise a web-based, highly customizable dashboard visualization that provides a diverse variety of workload data selection and playback options including (but not limited to): single data point selection; multiple data point selection; displays or views of data point sets or groupings as analysis points; a variety of selectable dashboard type visuals or views including charts, graphs, meters, etc. for individual or grouped data points; time frame specification including start and stop per workload; stand-alone workload playback capabilities; multiple workloads playback capabilities using the same or separate views to provide side-by-side workload data point comparisons; pause, rewind, forward capabilities for the workload data viewed; optional real-time updated counters/indicators for minimum, maximum, mean, and standard deviation for each data point specified; and scoring of a workload efficacy using predefined threshold values and/or targets by data point or collective data points.

Figure 4:
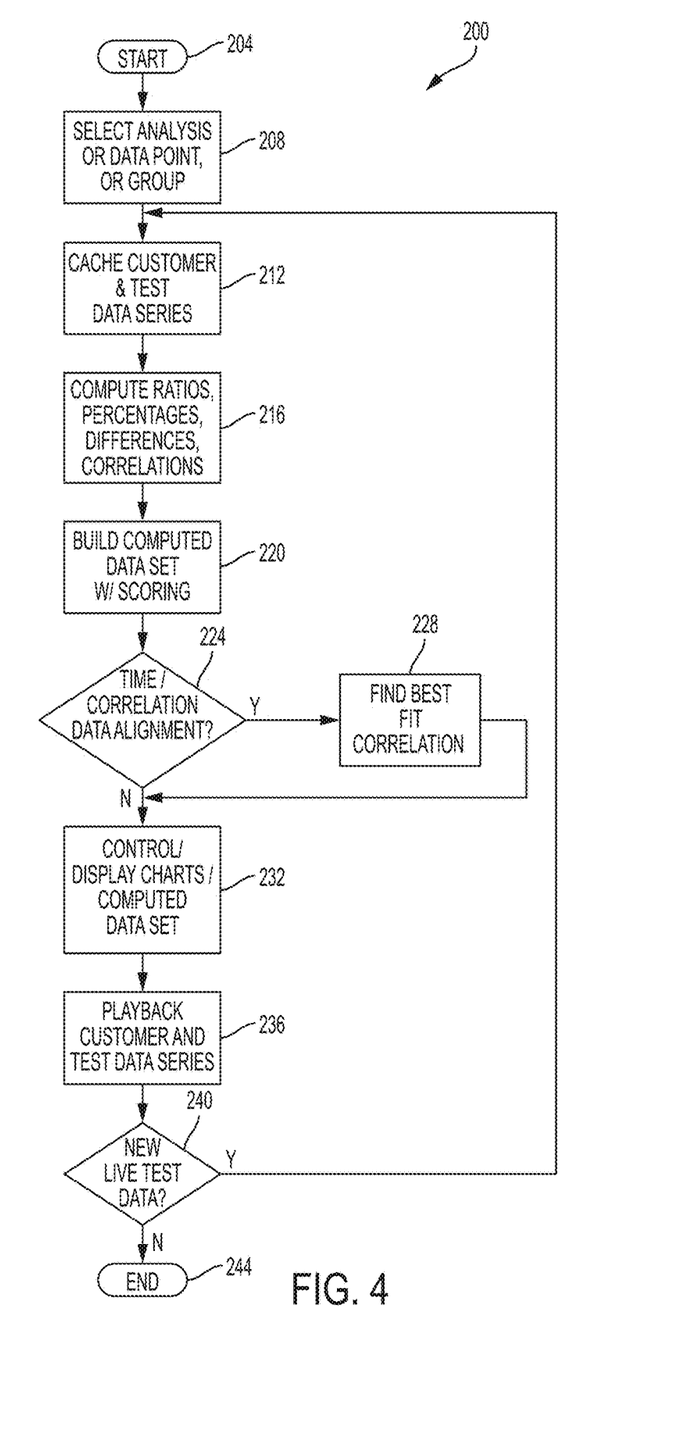
FIG. 4 is a flow diagram of a method for comparing data from a prior software workload run to data from a current software workload run and for visually presenting the resulting compared data to a user for further data interpretation, in accordance with one or more embodiments of the present invention.

With reference now to FIG. 4, a flow diagram illustrates a method 200 according to one or more embodiments of the present invention for comparing data from a prior software workload run to data from a current software workload run and for visually presenting the resulting compared data to a user for further data interpretation.

In one or more embodiments of the present invention, the method 200 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 100 described hereinabove and illustrated in FIG. 3, or in some other type of computing or processing environment.

Figure 5:
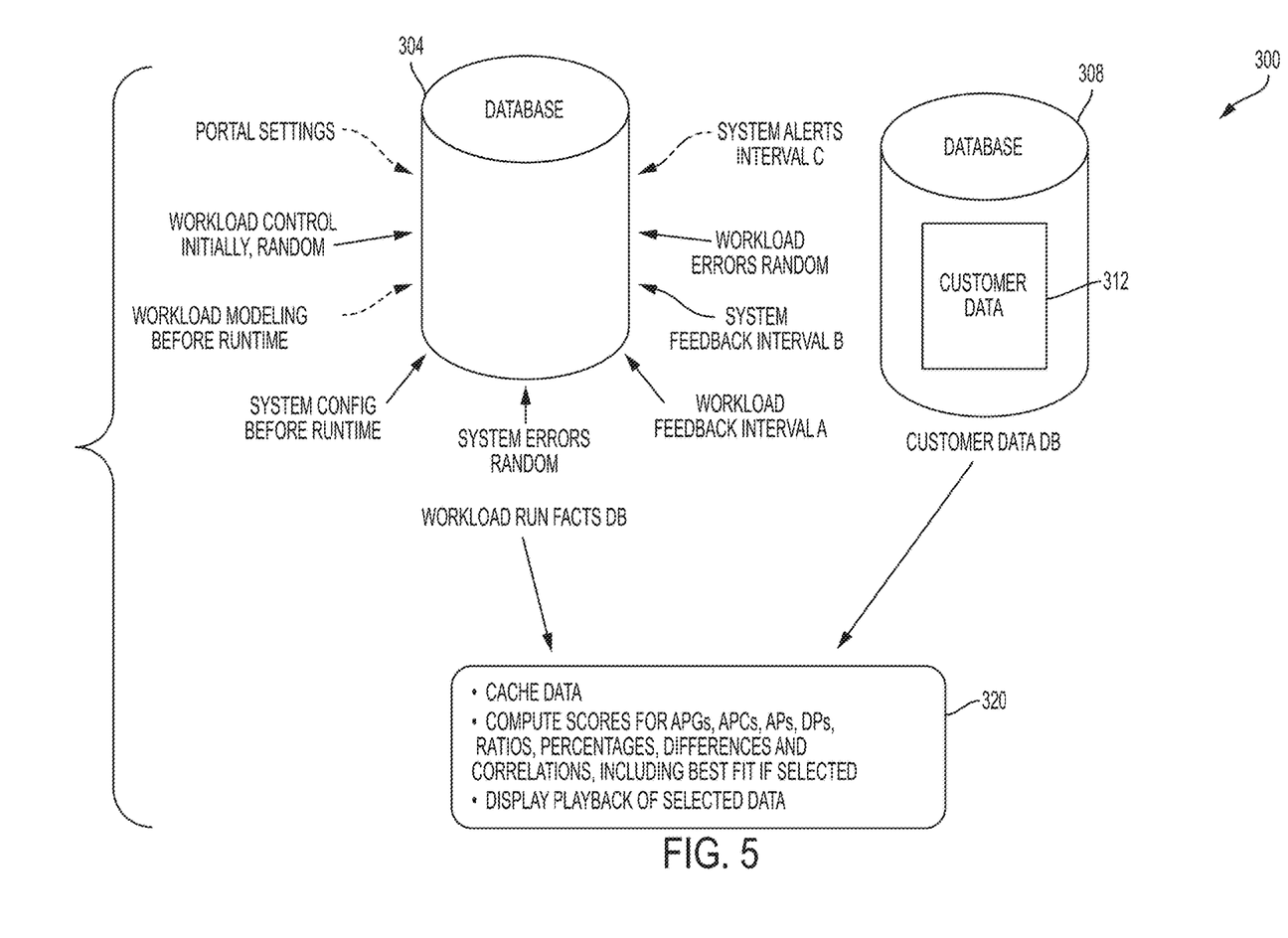
FIG. 5 is a block diagram of a system having two databases that store various types of data for use with the method of FIG. 4, in accordance with one or more embodiments of the present invention.

Referring also to FIG. 5, there illustrated is a block diagram of a system 300 having two databases 304, 308 that store various types of data for use with the method 200 of FIG. 4 and in accordance with one or more embodiments of the present invention. One of the databases 304 may store test workload run facts (i.e., data relating to prior test runs), while the other database 308 may store customer data 312.

The method 200 begins in a block 204, followed by a block 208 in which an operation is performed that selects the type of customer and test workload data to be used in an iteration of the method 200. The type of data selected may comprise analysis data, one or more data points, or groups of data.

In block 212, an operation is performed in which the selected customer and test data is cached or stored in the databases 304, 308 (see also block 320 in FIG. 5 for more detail).

In block 216, an operation is performed in which various statistical measures as between the customer data and the test data are computed or determined. These various statistical or alignment measures may include ratios, percentages, differences, correlations, etc. As these various statistical measures are being determined, they are being built into a resulting data set that utilizes scoring as a measure of the results of the determined statistical measures. This operation is performed in block 220.

In block 224, an operation is performed in which the method 200 checks if there is the desired amount of time and/or correlation in the alignment between the customer and test data. If so, an operation is performed in block 228 in which, for example, a best fit correlation between the data is determined or found. If not, an operation is performed in block 232 in which the compared or aligned customer and test data is displayed in the web dashboard visualization in the diagram 510 on the screen display of FIG. 6.

Figure 6:
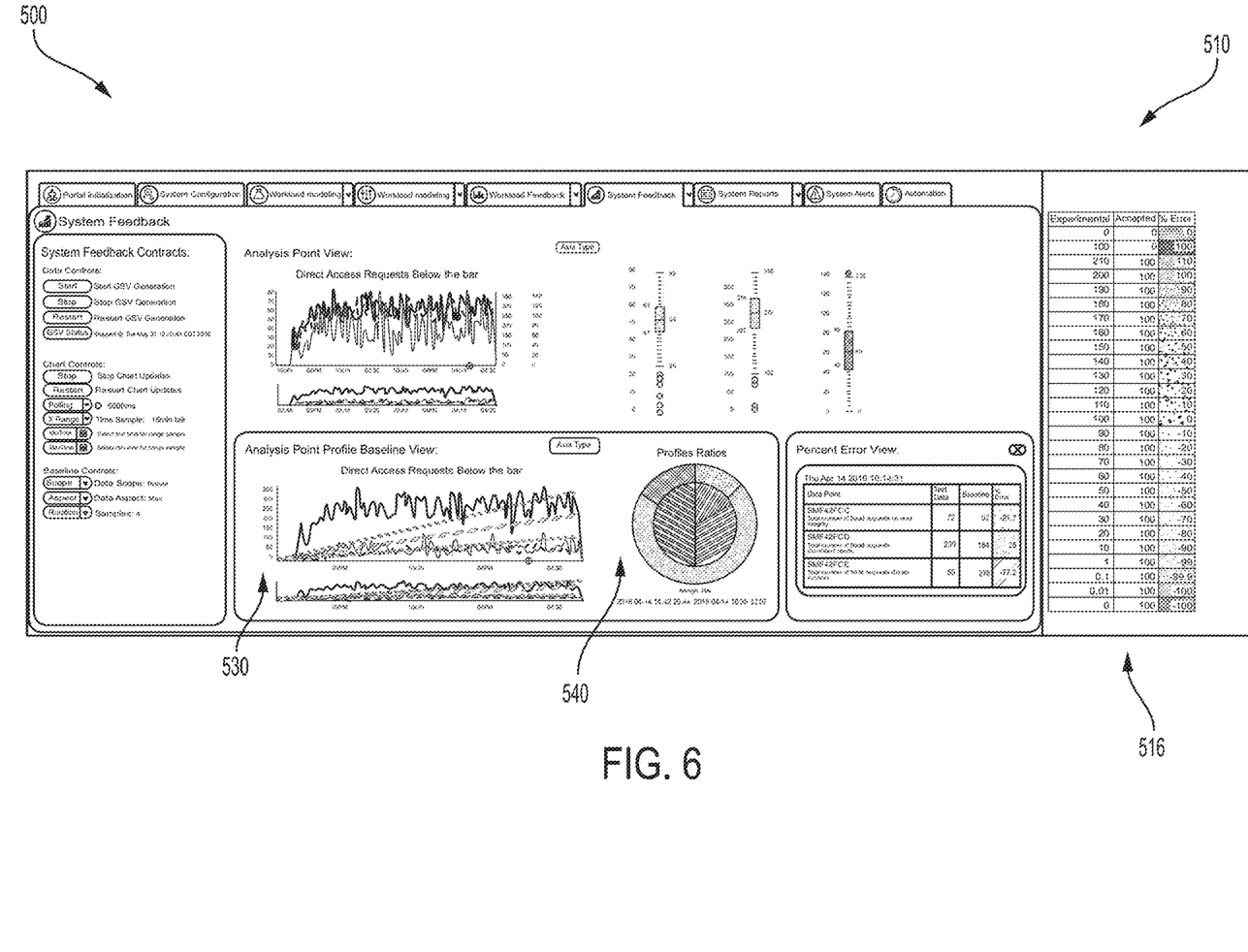
FIG. 6 is a diagram of a screen display that visually displays various types of data using various colors and other visual indicators, in accordance with one or more embodiments of the present invention.

Referring also to FIG. 6, there illustrated is a screen display 500 having a visual diagram 510 depicted thereon. The diagram 510 displays the various determined statistical measures using various colors and other visual indicators (e.g., donut and pie charts, graphs of analysis point data, etc.) in accordance with one or more embodiments of the present invention. The visual diagram 510 on the screen display 500 may be a type of web dashboard visualization, in accordance with embodiments of the present invention.

Specifically, in a region 540 of the diagram 510 of FIG. 6 is shown an outer donut chart of test data surrounding and an inner pie chart of customer baseline data. In accordance with one or more embodiments of the present invention, these donut and pie chart combinations show the ratios and percentages of the test and customer data, while allowing the user to make a relatively easy visual comparison of both types of data. In an actual screen display, these donut and pie charts are depicted in various colors to show the "Profiles Ratios" of the region 540. However, in FIG. 6 the various colors are indicated therein by various different types of black and white stiplings.

The diagram 510 of FIG. 6 also illustrates displayed baseline data in a region 530 within the diagram 510. The baseline data may be illustrated, for example, as line graphs depicting the varying value of one or more data points over time. In an actual screen display, these line graphs may be in color, with the different colors indicating the different data points. The analysis points may be related to both test data and customer data.

In addition, the statistical data resulting from the comparison of the customer data with the test data may be displayed in the box labeled "Percent Error View" in the diagram 510 of FIG. 6. In that box, the data in the column labeled "% Error" may also be in different colors in an actual display 500, to help the user quickly make a determination of the amount of percent error within or between the customer and the test data.

In the display visualization diagram 510 of FIG. 6, the scoring or statistical measures computed or determined that lend themselves to scoring by different colors are displayed, for example, in a box 516 on the right hand side of FIG. 6. In this box 516, the percentage error between the experimental and accepted data (or between the customer baseline data and the internal test data) as computed in the operations in block 216 may be shown in an actual display in color by using a relatively large number of different colors, as indicated by the corresponding various different types of stiplings shown in the column labeled "% Error" in FIG. 6 which represent the relatively large numbers of different colors that one would see if the screen display of FIG. 6 were in color.

It should be understood that the different types of graphs, charts, etc. shown in the diagram 510 of the display 500 of FIG. 6 are purely exemplary. Other display or visualization types may be utilized in accordance with embodiments of the present invention to provide the user with a relatively quick and easy way to see the customer data, the test data, and any operations conducted on these two types of data (e.g., comparisons, alignments, additions, subtractions, etc.).

In block 236, an operation is performed in which the customer and test data is played back, and then an operation is performed in block 240 to check is any new or "live" test data exists or has been generated. If not, the method ends in block 244. If so, the method may then branch back to the operation in block 212 in which the customer and test series data is stored or cached.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining, by a processor, prior workload run data from a database, wherein the prior workload run data comprises software, hardware and firmware data;
   obtaining, by the processor, current workload run data, wherein the current workload run data comprises software, hardware and firmware data;
   comparing, by the processor, the prior workload run data with the current workload run data to determine one or more statistical measures between the prior workload run data and the current workload run data; and
   displaying, by the processor using a customizable web-based dashboard visualization, the determined one or more statistical measures between the prior workload run data and the current workload run data to allow a user to analyze the prior workload run data and the current workload run data and displaying an error percentage indicating a percentage of error in the comparison of the prior workload run data and the current workload run data, wherein the customizable web-based dashboard visualization is configured to receive user inputs that allow a user to make workload data selections and utilize playback options.

2. The computer-implemented method of claim 1 wherein the one or more statistical measures between the prior workload run data and the current software workload run data is selected from the group consisting of ratios, percentages and differences.

3. The computer-implemented method of claim 1 wherein displaying, by the processor, the determined one or more statistical measures between the prior workload run data and the current workload run data comprises displaying, by the processor, the determined one or more statistical measures between the prior workload run data and the current workload run data using a plurality of different colors.

4. The computer-implemented method of claim 1 wherein displaying, by the processor, the determined one or more statistical measures between the prior workload run data and the current workload run data comprises displaying, by the processor, the determined one or more statistical measures between the prior workload run data and the current workload run data using groups of analysis points of data.

5. The computer-implemented method of claim 1 wherein displaying, by the processor, the determined one or more statistical measures between the prior workload run data and the current workload run data allows a user to analyze the prior workload run data and the current workload run data in real time.

6. The computer-implemented method of claim 1 wherein displaying, by the processor, the determined one or more statistical measures between the prior workload run data and the current workload run data allows a user to analyze the prior workload run data and the current workload run data in a post processing time.

7. The computer-implemented method of claim 1 wherein the data obtained by a processor from a database data relating to prior workload run comprises data relating to a customer.

8. A system comprising:
a processor in communication with one or more types of memory, the processor configured to:
obtain prior workload run data from a database, wherein the prior workload run data comprises software, hardware and firmware data;
obtaining current workload run data, wherein the current workload run data comprises software, hardware and firmware data;
compare the prior workload run data with the current workload run data to determine one or more statistical measures between the prior workload run data and the current workload run data; and
display, using a customizable web-based dashboard visualization, the determined one or more statistical measures between the prior workload run data and the current workload run data to allow a user to analyze the prior workload run data and the current workload run data and display an error percentage indicating a percentage of error in the comparison of the prior workload run data and the current workload run data, wherein the customizable web-based dashboard visualization is configured to receive user inputs that allow a user to make workload data selections and utilize playback options.

9. The system of claim 8 wherein the one or more statistical measures between the prior workload run data and the current workload run data is selected from the group consisting of ratios, percentages and differences.

10. The system of claim 8 wherein the processor configured to display the determined one or more statistical measures between the prior workload run data and the current workload run data comprises the processor configured to display the determined one or more statistical measures between the prior workload run data and the current workload run data using a plurality of different colors.

11. The system of claim 8 wherein the processor configured to display the determined one or more statistical measures between the prior workload run data and the current workload run data comprises the processor configured to display the determined one or more statistical measures between the prior workload run data and the current workload run data using groups of analysis points of data.

12. The system of claim 8 wherein the processor configured to display the determined one or more statistical measures between the prior workload run data and the current workload run data allows a user to analyze the prior workload run data and the current workload run data in real time.

13. The system of claim 8 wherein the processor configured to display the determined one or more statistical measures between the prior workload run data and the current workload run data allows a user to analyze the prior workload run data and the current workload run data in a post processing time.

14. The system of claim 8 wherein the data obtained by a processor from a database data relating to prior workload run comprises data relating to a customer.

15. A computer program product comprising:
a non-transitory storage medium readable by a processing circuit and storing instructions for execution by the processing circuit for performing a method comprising:
obtaining, by a processor, prior workload run data from a database, wherein the prior workload run data comprises software, hardware and firmware data;
obtaining, by the processor, current workload run data, wherein the current workload run data comprises software, hardware and firmware data;
comparing, by the processor, the prior workload run data with the current workload run data to determine one or more statistical measures between the prior workload run data and the current workload run data; and
displaying, by the processor using a customizable web-based dashboard visualization, the determined one or more statistical measures between the prior workload run data and the current workload run data to allow a user to analyze the prior workload run data and the current workload run data and displaying an error percentage indicating a percentage of error in the comparison of the prior workload run data and the current workload run data, wherein the customizable web-based dashboard visualization is configured to receive user inputs that allow a user to make workload data selections and utilize playback options.

16. The computer program product of claim 15 wherein the one or more statistical measures between the prior workload run data and the current workload run data is selected from the group consisting of ratios, percentages and differences.

17. The computer program product of claim 15 wherein displaying, by the processor, the determined one or more statistical measures between the prior workload run data and the current workload run data comprises displaying, by the processor, the determined one or more statistical measures between the prior workload run data and the current workload run data using a plurality of different colors.

18. The computer program product of claim 15 wherein displaying, by the processor, the determined one or more statistical measures between the prior workload run data and the current workload run data comprises displaying, by the processor, the determined one or more statistical measures between the prior workload run data and the current software workload run data using groups of analysis points of data.

19. The computer program product of claim 15 wherein displaying, by the processor, the determined one or more statistical measures between the prior workload run data and the current workload run data allows a user to analyze the prior workload run data and the current workload run data in real time.

20. The computer program product of claim 15 wherein displaying, by the processor, the determined one or more statistical measures between the prior workload run data and the current workload run data allows a user to analyze the prior workload run data and the current workload run data in a post processing time.

* * * * *